United States Patent [19]

Hollingsworth

[11] Patent Number: 4,564,179
[45] Date of Patent: Jan. 14, 1986

[54] ARTICULATED SUPPORT ARM APPARATUS

[76] Inventor: Ashley J. Hollingsworth, 48 Manzanita Rd., Atherton, Calif. 94025

[21] Appl. No.: 599,493

[22] Filed: Apr. 12, 1984

[51] Int. Cl.⁴ .............................................. B23Q 1/04
[52] U.S. Cl. ........................................ 269/71; 269/83
[58] Field of Search .............. 269/45, 71–72, 269/82–85; 248/278, 214; 403/92, 145, 149, 34; 254/29 A

[56] References Cited

U.S. PATENT DOCUMENTS

| | | | |
|---|---|---|---|
| 2,444,727 | 7/1948 | Bush | 269/84 |
| 2,669,958 | 2/1954 | Sweeney | 269/45 |
| 2,892,648 | 6/1959 | Turner | 403/92 |
| 3,588,044 | 6/1971 | Reichrath | 254/29 A |
| 4,253,649 | 3/1981 | Hewson | 269/45 |

FOREIGN PATENT DOCUMENTS

136516  2/1950  United Kingdom .................. 403/92

Primary Examiner—Robert C. Watson
Attorney, Agent, or Firm—Flehr, Hohbach, Test, Albritton & Herbert

[57] ABSTRACT

Articulated support arm apparatus for use by an operator which comprises a base and first and second arms supported by said base. A work device is supported by said arms. A dual axis joint interconnects said first and second arms. The joint is movable between locked and unlocked positions. In the unlocked position the work device is movable by the operator to a desired position and in a locked position the work device is held in a predetermined position.

27 Claims, 10 Drawing Figures

ARTICULATED SUPPORT ARM APPARATUS

This invention relates to an articulated support arm apparatus and more particularly to such an apparatus which can be utilized for holding a work device in a predetermined position.

In the past, a plurality of different types of work clamps, support devices and the like have been disclosed. Such devices are disclosed in U.S. Pat. Nos. 1,123,127, 1,572,215, 1,785,095, 2,348,961, 2,510,198, 3,168,274, 2,586,417, 2,660,074, 3,222,866, 3,593,952, 3,625,084. By examining these disclosures, it can be seen that they relate to either single joint arms or arms that move with joints having only one axis or arm which utilize joints which must be locked up individually by hand. In U.S. Pat. No. 3,820,752, there is disclosed an apparatus in which single axis joints are provided which can be locked up simultaneously. However, such arrangements are only suitable where the force is always in one direction. In other words, the apparatus will not lock up positively in all directions because only single axis joints are utilized. There is therefore a need for articulated support arm apparatus which will overcome these disadvantages.

In general, it is an object of the present invention to provide an articulated support arm apparatus which can be locked up when the work device carried by the apparatus has been moved to the desired location.

Another object of the invention is to provide an apparatus of the above character in which complete freedom of movement is provided for the work device.

Another object of the invention is to provide an apparatus of the above character in which multiple joints can be utilized.

Another object of the invention is to provide an apparatus of the above character in which the joints utilized can be locked up substantially simultaneously.

Another object of the invention is to provide an apparatus of the above character in which the joints can be released substantially simultaneously.

Another object of the invention is to provide an apparatus of the above character in which a high clamping force is provided when the joints are locked up.

Another object of the invention is to provide an apparatus of the above character in which dual axis joints are utilized.

Another object of the invention is to provide an apparatus of the above character in which clamping forces are supplied to both axes of each joint substantially simultaneously.

Another object of the invention is to provide an apparatus of the above character which can be manufactured economically.

Another object of the invention is to provide an apparatus of the above character which is relatively simple in construction.

Additional objects and advantages of the invention will appear from the following description in which the preferred embodiments are set forth in detail in conjunction with the accompanying drawings.

In general the articulated support arm apparatus of the present invention is for use by an operator. It is comprised of a base with first and second support arms supported by the base. A work device is supported by the arms. A dual axis joint interconnects the first and second arms. The joint is movable between locked and unlocked positions whereby in the unlocked position the work device can be moved by the operator. Means is provided for locking the joint in the locked position in a predetermined position of the work device after the work device has been moved by the operator to a desired location to lock the work device in the desired location.

Figures 1, 5, 6:
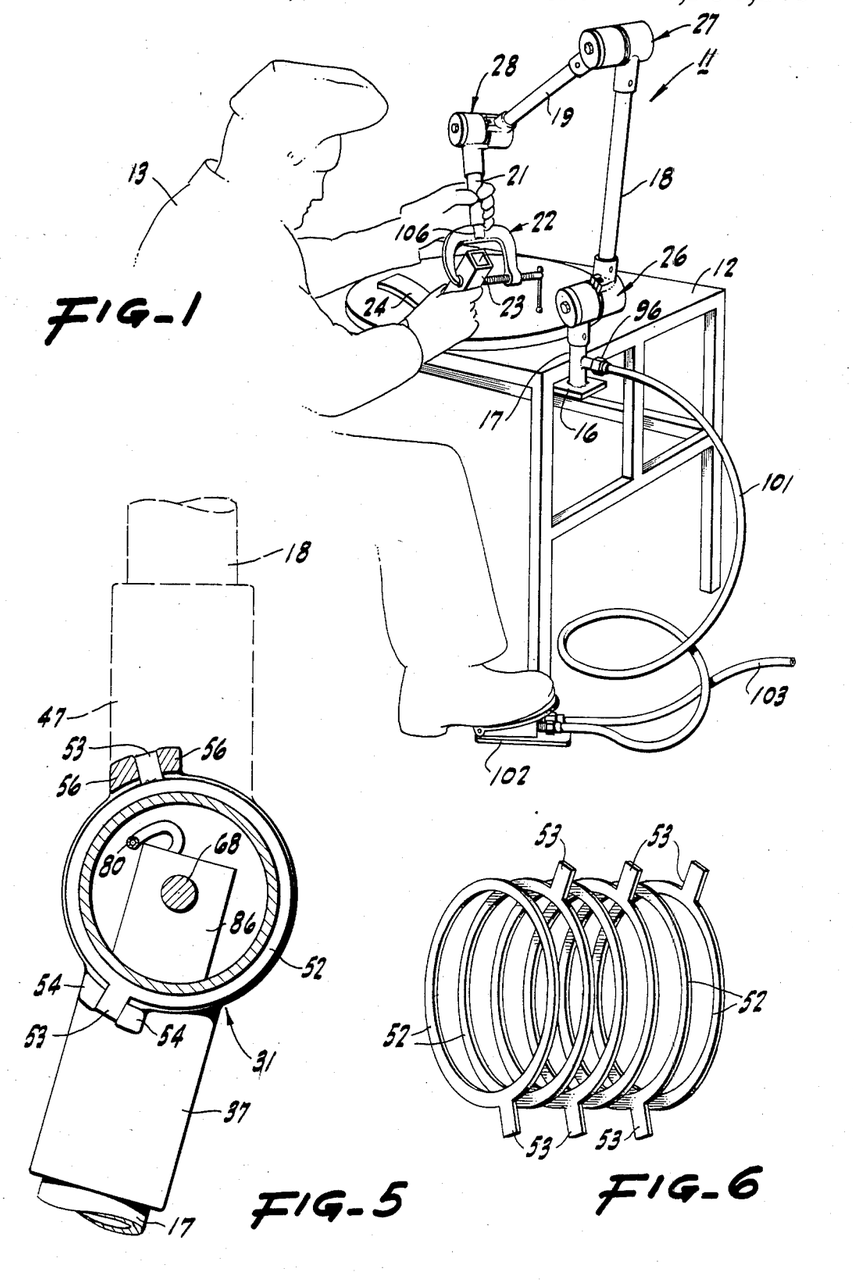
FIG. 1 is a perspective view of an articulated support arm apparatus incorporating the present invention mounted upon a work table and being used by a worker.
FIG. 5 is a cross sectional view taken along the line 5—5 of FIG. 2.
FIG. 6 is an isometric view showing the arrangement of the friction rings utilized in the dual axis joint in FIG. 5.

More particularly, as shown in the drawing, the articulated support arm apparatus 11 of the present invention as shown in FIG. 1 is mounted upon a work table 12 for use by a seated operator or worker 13. The articulated support arm apparatus 11 consists of a base 16. The base 16 as shown in FIG. 1 can be rectangular and is permanently mounted on the table in a suitable manner such as by welding it to one edge of the table. Alternatively, if desired, the apparatus can be removably mounted on the table 12 as, for example, by the use of a C-clamp (not shown) for securing the base 16 to the top of the table 12. The apparatus 11 also consists of a first arm 17, a second arm 18, a third arm 19 and a fourth arm 21. A work device 22 is supported by these arms and as shown is connected to the lower extremity of the fourth arm 21. The work device can be of any suitable type, as for example, the C-clamp which is shown which can be utilized for holding a work piece 23. Let it be assumed that the work piece 23 is to be welded to another member 24 lying on the top of the table 12. By utilizing the articulated support arm apparatus 11 hereinafter described to properly position the work piece 23 with respect to the member 24, the two pieces 23 and 24 can be properly positioned so that the member 23 is held in a position suitable for welding to the member 24. Both hands of the operator are free to perform the welding operation.

As shown in the drawings, the first arm 17 extends upwardly in a vertical direction from the base 16. First, second and third dual axis joints 26, 27, and 28 respectively are utilized for interconnecting the first and second, second and third, and third and fourth arms respectively. These dual axis joints are identical. The construction of one of these dual axis joints is shown in FIGS. 2 through 6.

The dual axis joint 26 as shown in FIGS. 2 through 6 consists of generally L-shaped joint members 31 and 32. The joint member 31 consists of a cylindrical member 33 which is closed at one end by a wall 34 and open at the other end to provide a cylindrical recess 35. An annular recess 36 is formed on the outer extremity of the cylindrical member 33. The joint member 31 also consists of a cylindrical tubular member 37 which is formed integral with and extends radially of the cylindrical member 33. It is provided with a cylindrical passage 38 which extends along an axis which is perpendicular to the axis of the cylindrical member 33.

Figures 2, 3, 4:
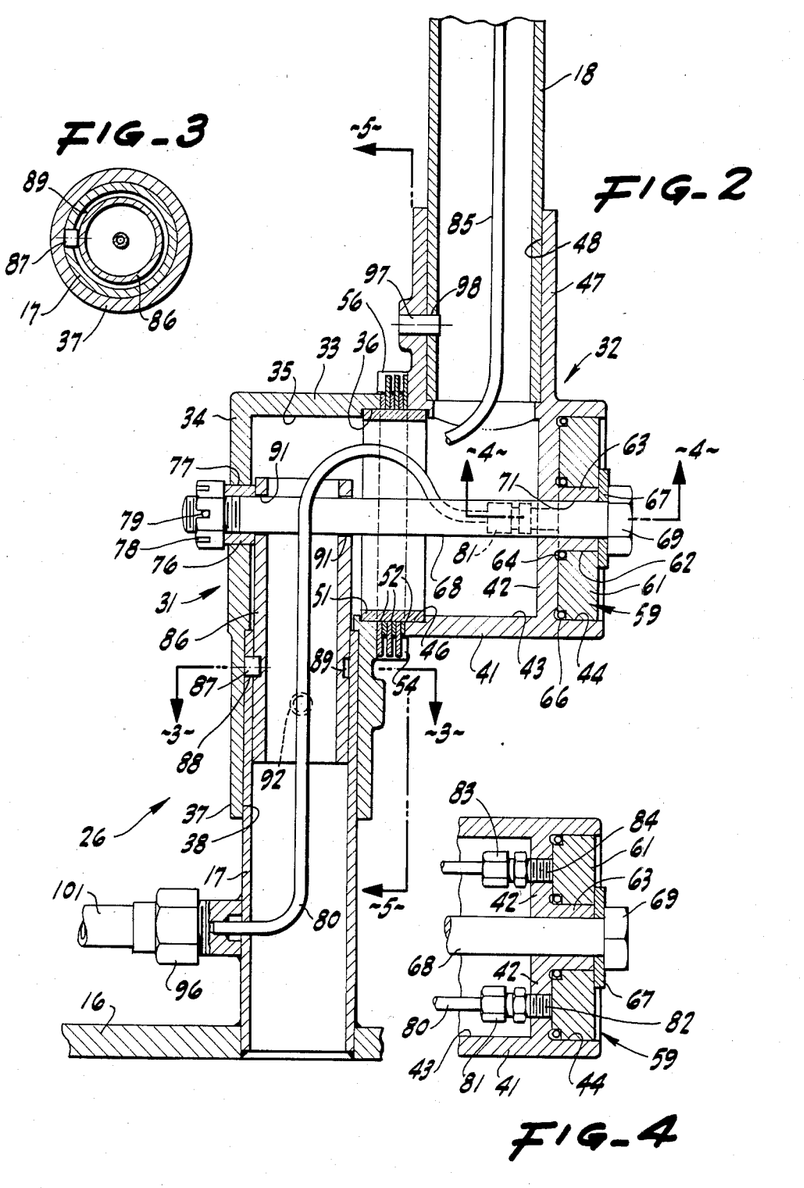
FIG. 2 is a cross sectional view of one of the dual axis joints utilized in the apparatus shown in FIG. 1.
FIG. 3 is a cross sectional view taken along the line 3—3 of FIG. 2.
FIG. 4 is a cross sectional view taken along the line 4—4 of FIG. 2.

The joint member 32 consists of a cylindrical member 41 having a diametrically extending wall 42 and an open end on each side of the wall to provide cylindrical recesses 43 and 44. As can be seen, the cylindrical recess 44 is somewhat shallower than the cylindrical recess 43. The joint member 32 is provided with an annular recess 46 near the outer extremity of the recess 43. The joint member 32 also consists of a cylindrical tubular member 47 which is formed integral with and extends radially of the cylindrical member 41. It is provided with a cylindrical passage 48 which extends at right angles to the axis of the cylindrical recess 44.

A joint bushing 51 fits into the annular recesses 36 and 46 of the two joint members 31 and 32 and interconnects the joint members 31 and 32. A plurality of friction rings 52 are slidably mounted upon the joint bushing 51 and are juxtaposed with respect to each other. Each of the friction rings 52 is provided with a lobe 53 extending radially therefrom. The lobes 53 of opposite rings extend in a direction which are displaced with respect to the lobes 53 of the other rings. The lobes 53 extending in one direction are disposed between spaced parallel ears 54 provided on the joint member 31 whereas the lobes 53 extending in the other direction are disposed between a pair of spaced parallel ears 56 carried by the joint member 32.

Piston means 59 is provided for moving the joint members 31 and 32 between locked and unlocked positions with respect to each other whereby in the unlocked position, one joint member can be rotated with respect to the other joint member and in locked position, relative rotation between the joint members is prevented. This piston means 59 includes means for moving the friction rings 52 into tight frictional engagement with each other to establish the locking position and for relieving the frictional engagement between the friction rings 52 so as to permit relative rotation of the joint members 31 and 32 with respect to each other. Piston means 59 consists of a cylindrical piston 61 which is disposed within the recess 44. The piston 61 is provided with an opening 62 which slidably fits on a boss 63 formed integral with the wall 43. Sealing means is provided for establishing a seal between the piston 61 and the cylindrical member 41 in which it is mounted and consists of a pair of O-rings 64 and 66 with O-ring 64 being disposed between the inner margin of the piston 61 and the boss 63 and the O-ring 66 being disposed between the outer margin of the piston 61 and the recess 44. Means is provided for retaining the piston within the recess 44 and consists of a washer 67 overlying the opening 62 and extending over the boss 63. A bolt 68 having a hexagonal head 69 extends through a bore 71 provided in the boss 63 and through the washer 67. The bolt 68 extends through the joint members 31 and 32 and extends through a sleeve 76 mounted in a hole 77 provided in the joint member 31. A castellated nut 78 is threaded onto the bolt 68 and is held in place by a cotter pin 79.

Means is provided for operating the piston 61 and consists of means for supplying fluid to the underside of the piston between the piston 61 and the wall 42 and consists of a flexible tube 80 of a suitable material such as Nylon tubing which is connected to a fitting 81 threaded into the wall 42. The wall 42 has a flow passage 82 therein extending through the wall to the space between the wall 43 and the piston 61. When fluid is supplied under pressure to the tube 80, fluid will be supplied to the space between the piston 61 and the wall 42 to cause movement of the piston 61 in an outward direction with respect to the cylindrical recess 44 and to cause the bolt 68 to cause relative movement of the joint member 32 and joint member 31 towards each other to cause the friction rings 52 to frictionally engage each other. Rotational movement between the joint member 31 and 32 is thereby inhibited to such an extent as to lock up the two joint members 31 and 32 to prevent rotational movement with respect to each other. Similarly, when pressure on the fluid in tube 80 is released, it can be seen that the joint members 31 and 32 will again move outwardly with respect to each other to relieve the frictional engagement between the friction rings 52 to thereafter permit rotational movement of the joint members 31 and 32 with respect to each other. As disclosed previously, the friction rings 52 are keyed alternately to each half of the dual axis joint or, in other words, the joint members 31 and 32. By providing multiple friction rings 52 there is provided a multiplying effect on the friction. For example, 8 friction rings provide 9 surfaces to thereby provide a 9 to 1 ratio in increase in friction.

Means is provided for supplying fluid to the other dual axis joints of the apparatus and consists of a fitting 82 which is mounted in the wall 42. The wall 42 is provided with a passage 84 which opens into the space between the piston 61 and the wall 42. The fitting 83 is connected to a tubular member 85 also formed of a suitable material such as Nylon. This tubular member 85 is secured to the fitting of the next dual axis joint in the same manner that the tubular member 80 is secured to the fitting 81 mounted in the wall 42.

The hereinbefore described rotation between the joint members 31 and 32 provides one axis of rotation. An additional axis of rotation for each of the dual axis joints is provided by rotational movement of one of the arms within a joint member. For example as shown in FIG. 2, the arm 17 is in the form of a sleeve which is rotatably mounted in the cylindrical tubular member 37. As can be seen from FIG. 2, the arm in the form of the sleeve 17 extends over a cylindrical clamping tube 86 and has its innermost extremity retained between the clamping tube 86 and the interior of the tubular member 37. The arm 17 is restrained from longitudinal movement with respect to the clamping tube 86 by retaining means in the form of a small cylinder 87 which is disposed in a hole 88 provided in the sleeve 18 and rotatably movable in an annular recess 89 provided in the outer surface of the clamping tube 86. From the construction shown it can be seen that the round button 87 is entrapped so that it cannot fall out. The innermost extremity of the clamping tube 86 is provided with a hole 91 extending at right angles to the axis of the clamping tube 86 and through which the bolt 68 extends. With this arrangement it can be seen that when fluid such as air is supplied to the piston 61, the bolt 68 through the nut 78 applies a force to the sleeve 76. The sleeve 76 engages the lower extremity of the clamping tube 86 to force it inwardly and to cause canting or tilting of the innermost extremity of the clamping member which in turn causes the innermost extremity of the sleeve 17 to be canted into frictional engagement with the cylindrical tubular member 37. This prevents rotation of the arm or sleeve 17. A greater than one to one clamping force is provided between the arm 18 and the tubular member 37. For this reason, friction rings are unnecessary. It can be seen that by applying pressure to the bolt 68 both axes of rotation of the dual axis joint are locked up. Similarly, when the force applied by the bolt 68 is released, both axes of rotation of the joint are relieved to permit rotation.

In the embodiment of the invention shown in FIG. 2, the tubing 80 is connected to a fitting 96. The fitting 96 is carried by the arm 17 mounted upon the base 16. The arm 18 is mounted in the tubular member 47 for forming a part of the joint member 32 and is retained therein by a locking pin 97 which is disposed in a hole 98 provided in the arm 18 to prevent rotation of the arm 18 in the tubular member 47. The fitting 96 as shown, particularly in FIG. 1, is connected to a flexible tube 101. The tube 101 is connected to a foot operated valve assembly 102 which is connected by a tube 103 to a suitable pressurized air supply (not shown).

It can be seen that when the bolt 68 is inserted in the hole 91 that the sleeve 17 is retained within the tubular member 37. An Alemite fitting 92 is is provided to facilitate rotational movement of the sleeve or arm 17 within the cylindrical member 37. Lubrication is desired when two different materials as, for example, aluminum is used for the tubular member 37 and steel is used for the arm or sleeve 17.

The second and third dual axis joints in the articulated support arm apparatus are constructed in a manner very similar to the first dual axis joint and therefore will not be described in detail. The fourth arm 21 carries the C-clamp assembly 22 as hereinbefore described. The C-clamp assembly is provided with a small tube 106 slidably mounted in the fourth arm 21 and secured thereto by suitable means such as a set screw (not shown). In order to prevent electrical current from flowing from the C-clamp assembly into the articulated support arm apparatus which could have deleterious effects on the apparatus, insulating means is provided between the tube 106 and the arm 21 and can take a suitable form as, for example, a ceramic coat provided on the exterior surface of the tube 106.

Operation and use of the articulated support arm apparatus may now be briefly described as follows. Let it be assumed that it is desired to perform a welding operation joining the pieces 23 and 24 shown in FIG. 1. The piece 24 can be laid on the table 12 and then the other piece 23 can be clamped into the C-clamp 22. Now let it be assumed that it is desired to support the piece 23 in an appropriate position so that it can be welded to the piece 24. To accomplish this, the foot pedal assembly 102 is operated. The foot pedal assembly is a normally open type whereby when it is not operated, air is supplied to the tubular members 80 and 85 connected to the dual axis joints to apply pressure to the bolts 68 and thereby lock up the joints in the positions in which they are disposed. When the foot pedal assembly 102 is operated, air is bled out of the tubular members to release the friction rings 52 and to permit movement of the articulated support arm apparatus 11 in all the necessary directions to permit proper positioning of the work piece 23 with respect to the work piece 24. After this has been accomplished, the foot pedal can be released which will apply a fluid such as air to the dual axis joints 26, 27 and 28 to thereby lock up the joints and prevent further movement of the articulated support arm apparatus. This locks the work piece 23 in the desired position so that the two hands of the operator are free to carry out the welding operation. As soon as the welding operation has been completed and it is desired to remove the work piece, the clamping device 22 can be operated to do so. It it is desired to move the outer extremity of the articulated support arm apparatus 11, the foot pedal can again be operated to release the air from the apparatus and to permit movement of the apparatus.

Figures 7, 8:
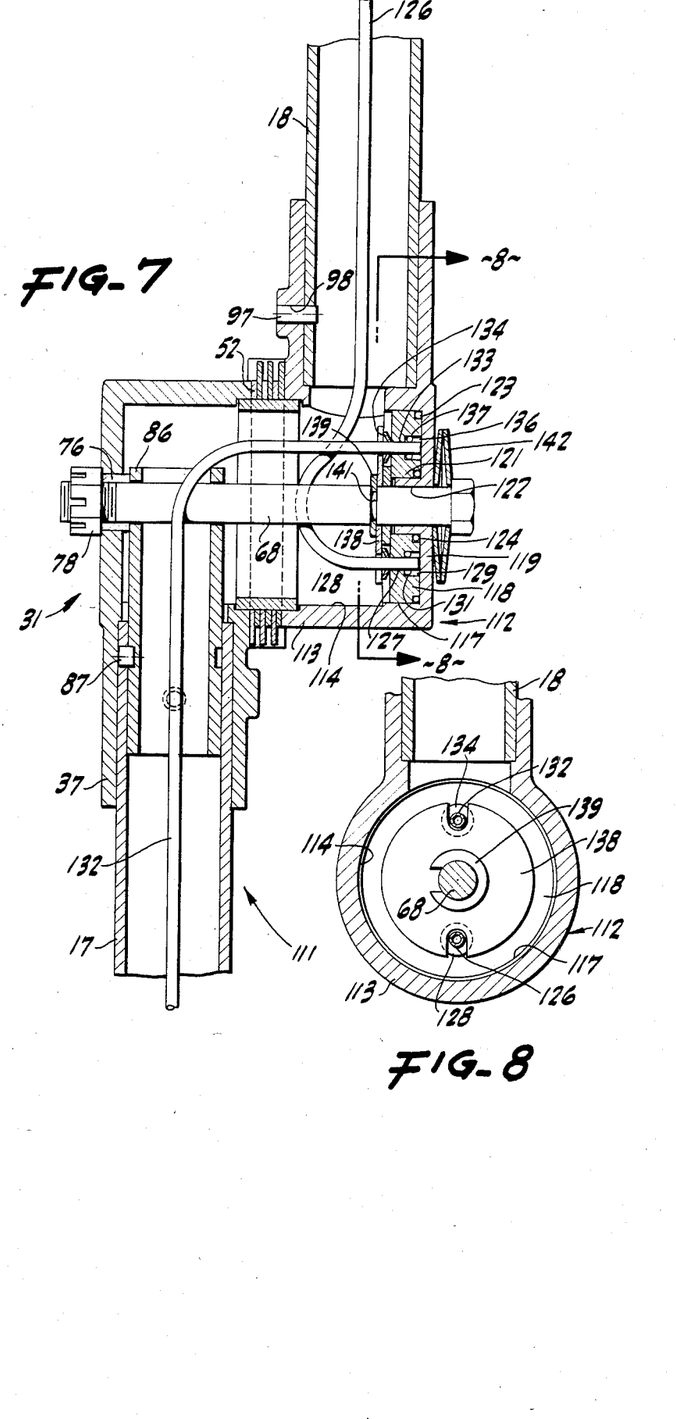
FIG. 7 is a cross sectional view of a dual axis joint of another embodiment of the present invention.
FIG. 8 is a cross sectional view taken along the line 8—8 of FIG. 7.

It can be seen that the articulated support arm apparatus by providing two axes of movement in each of the dual axis joints which are disposed 90° with respect to each other, that there is a complete freedom of movement of the outer extremity of the support arm apparatus to make it possible to position a work piece in any desired location within reach of the articulated support arm apparatus. Another embodiment of the articulated support arm apparatus is shown in FIGS. 7 and 8 and is an embodiment which is failsafe, i.e., in the event of a failure of an air supply, the articulated support arm apparatus will lock up and not move. As shown particularly in FIGS. 7 and 8, the articulated support arm apparatus 111 has many parts which are substantially identical to the parts utilized in the articulated support arm apparatus shown in FIGS. 1 through 6. The parts which are identical to the embodiment shown in FIGS. 1 through 6 are given the corresponding numbers in FIG. 7. The principal difference between the articulated support arm apparatus 111 in FIGS. 7 and 8 and the apparatus 11 shown in FIGS. 1-6 involves the direction in which force is applied to the bolt 68. To this end, a slightly different joint member 112 is substituted for the joint member 32 to cooperate with the joint member 31. The joint member 112 consists of a cylindrical member 113 which is provided with a cylindrical recess 114 that opens into an annular recess 116 provided on the outer margin of the cylindrical member 113. The cylindrical recess 114 also opens into a cylindrical well 117 which has a piston 118 slidably mounted therein. The cylindrical member 113 is provided with a wall which forms one side of the well 117. It is provided with a cylindrical boss 121 which has a hole 122 through which the bolt 68 extends. The piston 118 is slidably mounted on the boss 121. Sealing means is carried by the pistion 118 and consists of an O-ring 123 which is mounted in the outer margin of the piston 118 adjacent the wall 119 and another O-ring 124 carried by the piston 118 which engages the boss 121.

Means is provided for supplying fluid under pressure between the piston 118 and the wall 119 and consists of a flexible tube 126 formed of a suitable material such as Nylon. The tube extends through a hole 127 in the piston 118 and is retained therein by a push-on member 128 formed of a suitable material such as rubber and extends into the well 129. The piston is retained in the well by an O-ring 131. Means is provided for supplying fluid to additional two-axis joints in the apparatus and consists of another flexible tube 132 similar to the tube 126 which is also retained in another hole 133 in the piston 118 by a push-on member 134. The tube also extends into a well 136 and is retained in the well by an O-ring 137. The members 128 and 134 are retained in engagement with the piston 118 by a retaining disc 138. The retaining disc 138 is retained in place by a Truarc ring 139 mounted in an annular recess 141 provided in the bolt 68.

Means is provided for yieldably urging the bolt 68 in a direction away from the joint member 131 and consists of a Belleville spring 142 which is seated beneath the head 69 and on the side of the wall 119 opposite the side on which the piston 118 is disposed.

Operation and use of the articulated support arm apparatus 111 may now be briefly described as follows. The operation in many respects is the same as that for the previous embodiment with the exception that the Belleville washer 142 provides a yieldable force for causing frictional engagement between the friction rings 52 and for causing the sleeve 76 to move the clamping tube 86 into binding frictional engagement with the sleeve 18 and the cylindrical member 37 so that the dual axis joint will be locked up in the position shown.

To release the dual axis joint from such a locking position, it is merely necessary to supply fluid through the tube 126 of a suitable type such as air so it passes into the space between the piston 118 and the inner surface of the wall 119 to cause the piston 118 to apply force to the Truarc ring 139 and to urge the bolt 68 in a direction towards the right as viewed in FIG. 7 to compress the Belleville spring 142 and to thereby relieve the pressure on the friction rings 52 and on the clamping tube 86 to permit relatively free movement of the joint members 31 and 112 with respect to each other and to permit rotational movement of the arm 18 with respect to the tubular member 37 of the joint member 31. As soon as the dual axis joint has been moved into the desired position, the fluid under pressure from the tube 126 can be removed permitting the Belleville spring 142 to again urge the joint members 31 and 112 towards each other to cause the friction rings 52 to firmly frictionally engage each other in the manner hereinbefore described and also to cause the clamping tube to frictionally engage the sleeve 118 and the tubular member 37 to again lock up the joint.

It should be appreciated that when fluid is applied to the tube 126 fluid is also supplied to the tube 132 so that any other dual axis joints which are utilized in the articulated support arm apparatus are actuated substantially simultaneously.

It can be seen from the foregoing that there has been provided a dual axis joint for use in the articulated support arm apparatus of the present invention which is failsafe, i.e., in the event of failure of the source of supply of fluid for the tube 126, the articulated support arm apparatus will lock up. This is particularly important with respect to the situation in which the articulated support arm apparatus may be carrying a relatively heavy load. The use of the embodiment shown in FIG. 7 will prevent collapse of the support arm structure in the event of failure of the fluid supply. In other words, the articulated support arm apparatus mechanically locks up and will not fail in the event of the failure of a fluid supply. This makes it particularly useful in the chemical laboratory or the like to hold up equipment. Another advantage of the embodiment shown in FIGS. 7 and 8 is that the fluid can be hydraulic fluid since the piston 118 is only pressurized for short periods of time and there is little likelihood of leakage during such short periods of time.

Figures 9, 10:
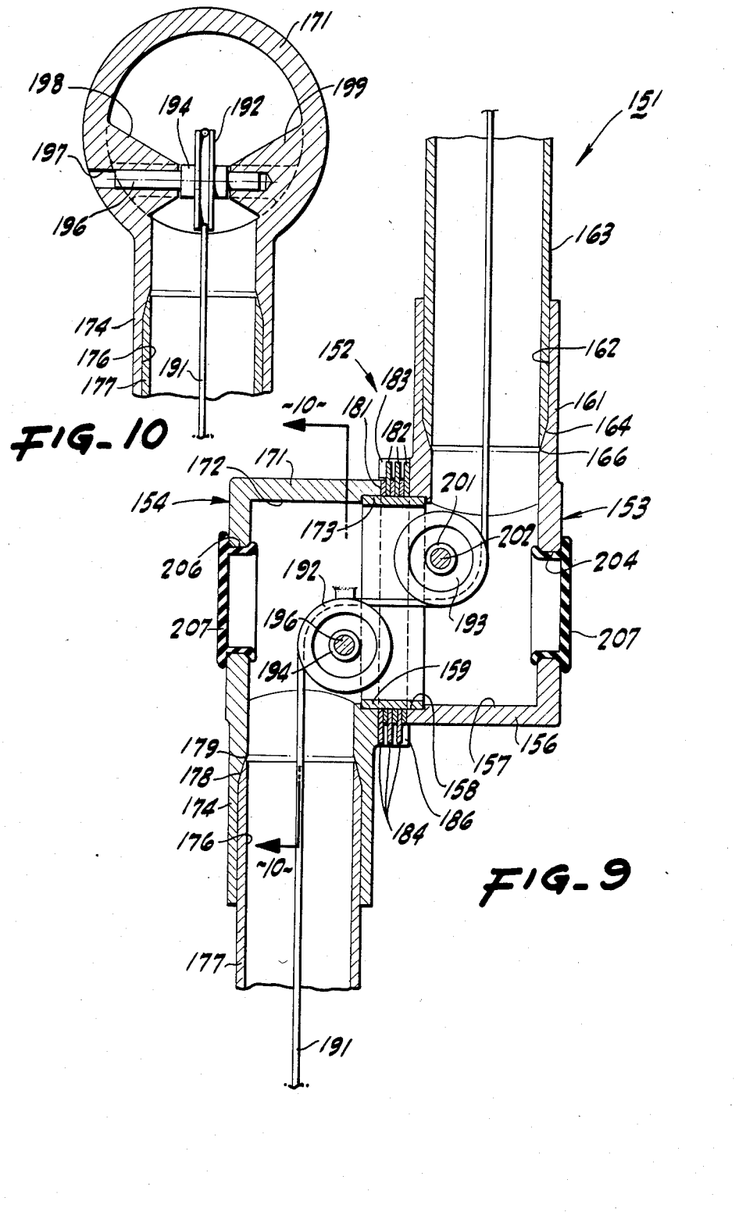
FIG. 9 is a cross sectional view of a dual axis joint of still another embodiment incorporating the present invention.
FIG. 10 is a cross sectional view taken along the line 10—10 of FIG. 9.

Another embodiment of an articulated support arm apparatus incorporating the present invention is shown in FIGS. 9 and 10. The articulated support arm apparatus 151 shown therein consists of dual axis joints 152 as shown in FIGS. 9 and 10. The dual axis joints as shown therein consist of joint members 153 and 154. The joint member 153 consists of a cylindrical member 156 which is provided with a cylindrical recess 157. The cylindrical recess 157 opens into an annular recess 158 which receives a joint bushing 159. The cylindrical member 156 also is provided with a cylindrical tubular member 161 which is provided with a cylindrical passage 162 into which a tubular arm 163 extends. The innermost extremity of the arm 163 is provided with a tapered annular surface 164 which is adapted to engage a corresponding tapered annular surface 166 provided on the interior surface of the tubular member 161. The joint member 154 is formed of a cylindrical member 171 which is provided with a cylindrical recess 172. The cylindrical recess 172 opens into an annular recess 173 which also receives the joint bushing 159. The joint member 154 is also provided with a cylindrical tubular member 174 that provides a cylindrical recess 176 in which there is mounted a hollow tubular member 177. The innermost extremity of the tubular member 177 is provided with an annular tapered surface 178 which is adapted to frictionally engage another tapered annular surface 179 provided on the interior of the cylindrical tubular member 174.

Friction rings 181 identical to the friction rings 152 are disposed on the joint bushing 159 and have lobes 182 disposed between pairs of parallel ears 183 provided on the cylindrical member 156 and other lobes 184 disposed between spaced parallel ears 186 carried by the joint member 154.

Means is provided for moving the joint members 152 and 154 into locking engagement with each other and consists of a tension cable 191 formed of a suitable material such as steel strands. The cable 191 passes upwardly through the hollow tubular member 177 into the recess 172 and over a pulley 192 carried by the joint member 154 and over another pulley 193 mounted upon the joint member 153 and upwardly through the tubular member or arm 163. The pulleys 192 and 193 are rotatably mounted in a suitable manner within the joint members 153 and 154. Thus as shown pulley 192 is provided with a hub 194 which is rotatably mounted upon a shaft or pin 196 mounted by press fit in a passage 197 provided in spaced apart portions 198 and 199 formed integral with the cylindrical member 171. The pulley 193 is mounted in a similar manner and is provided with a hub 201 which is rotatably mounted upon a shaft or rod 202 which is also mounted in portions (not shown) formed integral with the cylindrical member 171.

From the foregoing description it can be seen that the tension cable 191 can travel up to other dual axis joints constructed in the same manner as shown in FIGS. 9 and 10. Observation ports 204 and 206 can be provided in the joint members 153 and 154 and can be closed by plastic covers 207.

Operation of the articulated support arm apparatus 151 utilizing dual axis joints 152 of the type shown in FIGS. 9 and 10 may now be briefly described as follows. It should be appreciated that any suitable means can be utilized for tensioning the cable 199 as, for example, a hand operated lever, a foot pedal device or a fluid operated plunger. When the cable 191 is tensioned forces will be applied to bring the members 153 and 154 towards each other to clamp the friction rings 191 into close engagement with each other and at the same time to apply forces to the tubular members 163 and 177 to cause frictional engagement of the tapered annular surfaces to thereby lock up the dual axis joint to prevent further rotational movement of the joint members 153 and 154 with respect to each other and at the same time also to prevent rotational movement of the tubular members 163 and 177 with respect to the cylindrical members in which they are mounted. These locking engagements can be released merely by releasing the tension on the cable 191.

It is apparent from the foregoing that there has been provided an articulated support arm apparatus which has many advantages. Each joint has a dual axis which can be locked up simultaneously. A high clamping force is provided. The apparatus is built up of parts which are relatively simple in construction and which can be readily fabricated and assembled. A relatively small number of parts makes the apparatus relatively simple and inexpensive. This makes it possible for the articulated support arm apparatus to lend itself to many applications, particularly in applications where the operator desires to keep his hands free while performing certain operations. Typical operations are welding and soldering applications. The apparatus can be utilized to take the place of many special fixtures.

What is claimed is:

1. In an articulated support arm apparatus for use by an operator, a base, first, second and third arms supported by said base, a work device supported by said arms, a dual axis joint interconnecting said first and second arms, an additional dual axis joint interconnecting said second and third arms, said joints being movable between locked and unlocked positions and control means for moving said joints to said locked and unlocked positions substantially simultaneously whereby in the unlocked positions said work device can be moved by the operator to a desired position and in locked positions the work device is held in a predetermined position.

2. In an articulated support arm apparatus for use by an operator, a base, first and second arms supported by said base, a work device supported by said arms, a dual axis joint interconnecting said first and second arms, said joint being movable between locked and unlocked positions and means for moving said joint to said locked and unlocked positions whereby in the unlocked position said work device can be moved by the operator to a desired position and in a locked position the work device is held in a predetermined position, said dual axis joint including first and second members, means for rotatably mounting said first and second members with respect to each other, a plurality of friction rings disposed between said first and second members, means carried by said first member for engaging certain of said friction rings so that said certain friction rings travel with said first member, means carried by said second member for engaging other of said friction rings whereby said other friction rings travel with the second member, and wherein said means for moving said joint to a locked position includes means for applying pressure to said friction rings to prevent rotation of said first and second members with respect to each other.

3. Apparatus as in claim 2 together with a tubular member carried by each of said first and second members, one of said tubular members being rotatable with respect to the member in which it is mounted and wherein said means for locking said joint in a locked position includes means for restraining rotation of said one tubular member with respect to the member in which it is mounted when said joint is in a locked position.

4. Apparatus as in claim 2 wherein said means for moving said joint to said locked and unlocked position includes a bolt extending between said first and second members and means for applying a force to said bolt to cause said members to be moved axially with respect to each other.

5. Apparatus as in claim 4 wherein said means applying a force to said bolt is in the form of yieldable spring means and means for overcoming the force of said yieldable spring means.

6. Apparatus as in claim 4 wherein said means for moving said joint to a locked position includes a piston coupled to said bolt and fluid means for supplying a force to said piston.

7. Apparatus as in claim 6 wherein said piston is positioned so that the force applied by the piston is in a direction to cause frictional engagement of the friction rings.

8. Apparatus as in claim 6 wherein said piston is positioned so that the force applied by the piston is in a direction to reduce the frictional engagement of the friction rings.

9. Apparatus as in claim 8 wherein said means for moving said joint to said locked and unlocked positions includes yieldable spring means for moving said bolt in a direction opposite to that supplied by the piston.

10. Apparatus as in claim 2 wherein said means for moving said joint to said locked and unlocked positions includes cable engaging surfaces provided in each of said members and a cable traveling over said surfaces whereby as the said cable is tensioned, said members are urged towards each other to bring the friction rings into frictional engagement with each other.

11. Apparatus as in claim 10 wherein said cable engaging surfaces includes first and second pulleys rotatably mounted in the first and second members.

12. Apparatus as in claim 10 together with first and second tubular members mounted in said first and second members and friction means carried by the tubular members and the first and second members for increasing the friction between the same when the cable is tensioned.

13. Apparatus as in claim 4 together with a tubular member mounted in one of said first and second members and permitting rotation of the tubular member with respect to said one member and preventing retraction of the tubular member and means coupled to said bolt for creating additional frictional forces between the tubular member and the cylindrical member when a force is applied to said bolt in one direction.

14. Apparatus as in claim 13 wherein said means for creating additional frictional forces to be supplied to said tubular member includes a clamping tube disposed within said tubular member and means securing said clamping tube to said tubular member, said clamping tube being disposed on said bolt and means carried by said bolt upon axial movement of the bolt for urging sidewise displacement of the clamping member to create additional frictional force between the tubular member and the cylindrical member.

15. Apparatus as in claim 14 wherein said clamping tube is provided with a hole and wherein said bolt extends through said hole, said bolt having a nut for engaging the clamping tube to move the tube into a clamping engagement when an axial force is applied to the bolt.

16. Apparatus as in claim 1 together with a fourth arm supported by the base and an additional dual axis joint interconnecting the third and fourth arms, and wherein said means for moving said joints to said locked and unlocked positions causes operation of said first named and additional dual axis joints simultaneously.

17. In an articulated support art apparatus for use by an operator, a base, first, second and third arms supported by the base, a work device supported by the arms, first and second joints interconnecting respectively the first and second arms and the second and third arms, said joints being movable between locked and unlocked positions, whereby in the unlocked position the work device is movable by the operator to a desired location and in the locked position holds the work device in the desired location and means for moving said first and second joints to said locked and unlocked positions substantially simultaneously.

18. Apparatus as in claim 17 wherein each of said joints includes first and second joint members and friction rings disposed between the joint members.

19. Apparatus as in claim 17 wherein each of said joints is a dual axis joint with one axis being the axis rotation of the first and second arms with respect to each other and the other axis of rotation being defined by one of the arms extending out of the cylindrical members and extending in a direction substantially at right angles to the direction of the first named axis of rotation.

20. Apparatus as in claim 19 together with means carried by the arm and the cylindrical member for preventing rotation of the arm at the time a force is being applied to bring the first and second cylindrical members into the locked position.

21. Apparatus as in claim 17 wherein said means for moving said first and second joints to said locked and unlocked position includes yieldable spring means for applying a force to urge the cylindrical members towards each other.

22. In a dual axis joint, first and second cylindrical members having cylindrical recesses therein, a bushing mounted in said first and second cylindrical members, friction rings carried by said joint bushing and each having a lobe extending therefrom, spaced parallel members carried by the second of said cylindrical members and engaging certain of the lobes from the friction rings, spaced parallel ears carried by the other of said members and engaging other lobes of said friction rings whereby as the first and second members are rotated the friction rings associated therewith are rotated and menas for applying force to the first and second members to bring the first and second members towards each other and to cause frictional engagement of the friction members to lock up the joint.

23. Apparatus as in claim 22 together with a tubular member carried by one of said cylindrical members, said tubular member being movable between a locked frictionally engaging position and an unlocked position and means for applying a force to increase the frictional engagement between the tubular member and a cylindrical member during the time that increased frictional forces are being applied to the friction rings.

24. Apparatus as in claim 22 wherein said means for applying a force to bring the first and second members towards each other includes a bolt extending through the first and second members and means for applying a force to the bolt for causing the bolt to bring said first and second cylindrical members towards each other.

25. Apparatus as in claim 24 wherein said means for applying a force to the bolt includes yieldable spring means.

26. Apparatus as in claim 24 wherein said means for applying a force to the bolt includes a piston member disposed within one of said members coupled to said bolt and means for supplying fluid under pressure to said piston.

27. Apparatus as in claim 25 together with a piston coupled to said bolt and means for supplying of fluid under pressure to said piston to cause a force to be applied to said bolt which overcomes the force applied by said yieldable means.

* * * * *